May 12, 1942.　　　　H. HAGEN　　　　2,282,866
ELECTRIC LIQUID MIXER AND HEATER
Filed Nov. 27, 1939　　　2 Sheets-Sheet 2
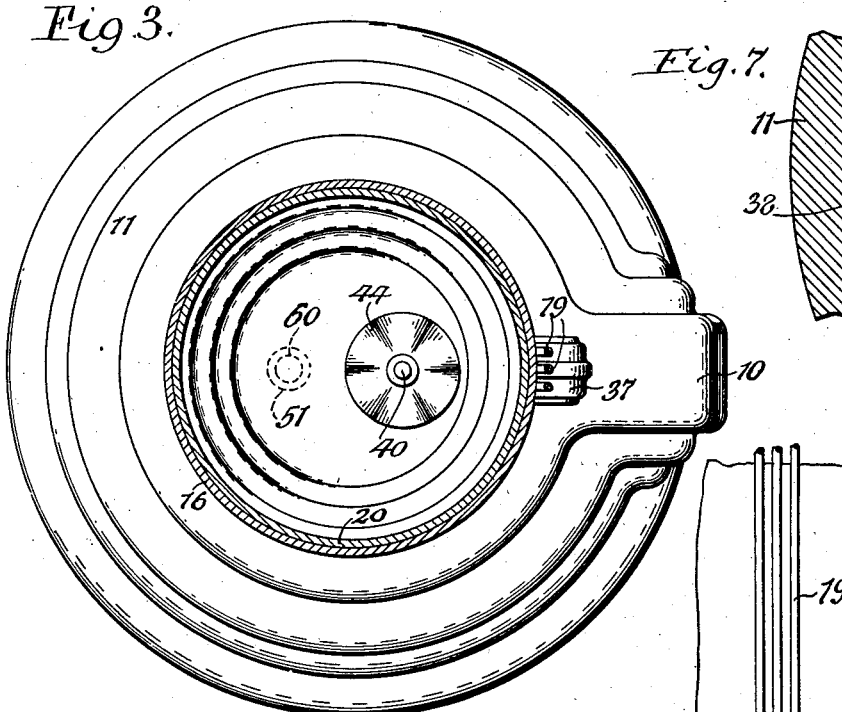
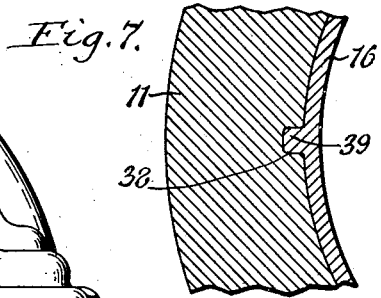
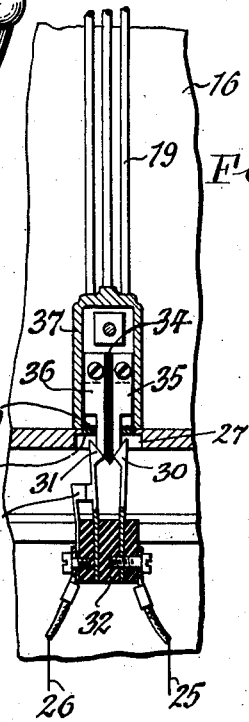
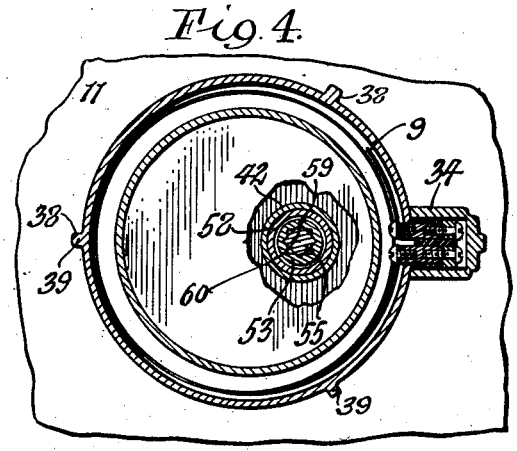
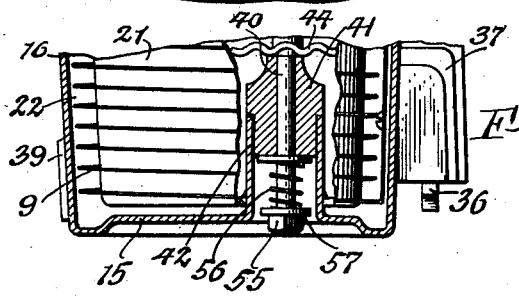
INVENTOR
Harold Hagen
BY
Popp & Popp
ATTORNEYS Patented May 12, 1942

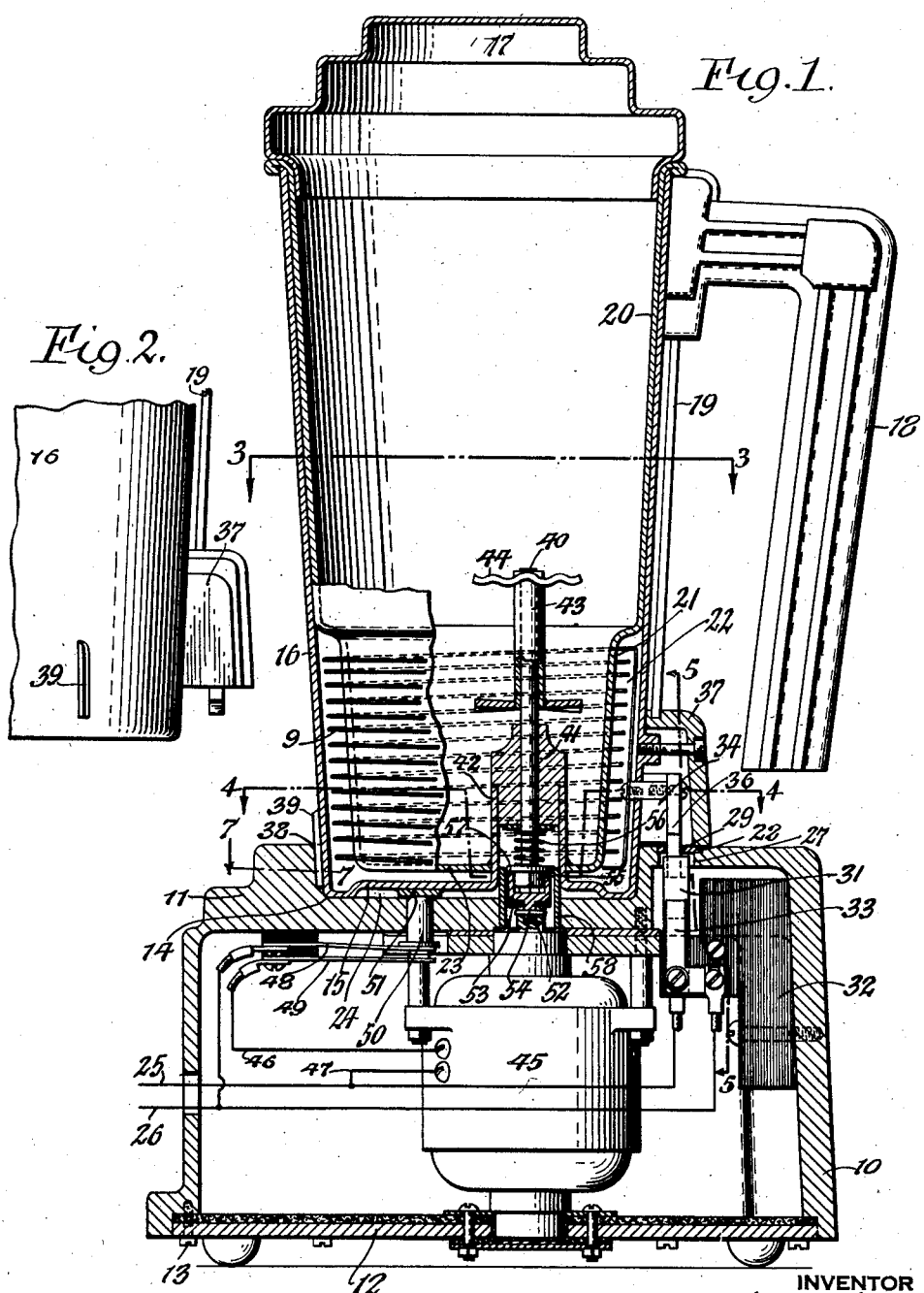

2,282,866

UNITED STATES PATENT OFFICE 2,282,866

ELECTRIC LIQUID MIXER AND HEATER

Harold Hagen, Buffalo, N. Y.

Application November 27, 1939, Serial No. 306,215

1 Claim. (Cl. 259—108)

This invention relates to a liquid mixer and heater and more particularly to a device of this character which is used at refreshment stands for serving drinks either mixed or unmixed and either hot or cold.

One of the objects of this invention is to provide a device of this character whereby the electric circuits for operating the mixing elements and the heating elements are closed and opened automatically upon manually placing the liquid container upon a base and removing the same therefrom and thus avoid the necessity of separately operating switches for this purpose and thereby saving time which is important when serving many customers during rush periods.

Another object of this invention is to so organize the agitating mechanism that when the same is in operation there will be no tendency to turn the liquid container but instead the latter will remain at rest and the liquid will be thoroughly mixed without the formation of a vortex therein which would interfere with the rapid and thorough mixing of the constituents of the beverage.

A further object of this invention is to mount the switch means whereby the electric current for the heating element and mixing element is controlled in such manner that the same are concealed and guarded so as to protect the operator from possible injury when using the mixing and heating device.

Additional objects of this invention are to simplify the construction of the device as a whole and render the same compact and neat in appearance and also enable the same to be used conveniently and expeditiously.

In the accompanying drawings:

Fig. 1 is a vertical section of a liquid mixer and heater embodying the improvements of this application.

Fig. 2 is a fragmentary side elevation of the liquid container removed from the base of the apparatus.

Figs. 3 and 4 are horizontal sections taken on the correspondingly numbered lines in Fig. 1.

Fig. 5 is a fragmentary vertical section taken on line 5—5, Fig. 1.

Fig. 6 is a fragmentary vertical section similar to Fig. 1 showing the liquid container removed from the base.

Fig. 7 is a fragmentary horizontal section taken on line 7—7, Fig. 1.

In the following description similar characters of reference indicate like parts in the several views of the drawings:

In general this liquid mixer and heater comprises a base, a liquid container mounted on the base, a liquid agitator arranged in the container, an electric heating element arranged in the container, and an electric motor mounted on the base and adapted to operate and agitate the liquid.

The base of the apparatus is hollow and provided with an upright circular side wall 10, a top 11 which closes the upper end of the base and is preferably formed integrally with the side wall from cast iron, and a bottom 12 which closes the lower end of the casing and is detachably connected with the side wall by screws 13 or otherwise.

In its upper side the top of the base is provided with a socket 14 in which is removably seated the lower end of a container or vessel which receives the liquid for mixing and heating or either of these treatments. This container comprises a lower bottom 15, an upwardly flaring circular side wall or body 16 and a cover 17 removably mounted on the upper end of the tapering wall or body. On its side wall the container is preferably provided with a handle 18 for manipulating the same and liability of burning the hand which grasps this handle is prevented by guard bars 19 projecting downwardly from the handle next to the container body and thus keeps the hand from coming in contact with this body and injuring the hand if the liquid in the container is hot.

Within the container is arranged a lining of metal, the upper wall part 20 of which is of large diameter so as to form a comparatively large space in this end of the container while the lower wall part 21 of the same is of smaller diameter and forms the annular section 22 of a heating chamber between the same and the adjacent lower part of the container body, and the horizontal bottom 23 of this lining is spaced from the bottom 15 of the outer wall of the container and forms therebetween the lower horizontal section 24 of the heating chamber, as shown in Fig. 1. In this heating chamber is arranged an electric heating element 9 whereby the contents of the container are heated and which may be of any suitable construction and is only represented diagrammatically in Figs. 1 and 6.

Electric coupling means are provided whereby upon placing the liquid container in the socket of the base the heating element will be automatically connected with the lines 25, 26 which supply the electric current operating this liquid heater and mixer, which coupling means in their preferred form, as shown in the drawings, are constructed as follows:

The numeral 27 represents an opening formed in the top of the base on one side of the socket in the same, which opening is partly covered by a protecting plate 28 of insulating material secured to the base and provided with a guide eye 29. Below this opening and on opposite sides of this eye are arranged the upper free ends of two main contacts 30, 31, the lower flexible ends of which are mounted on a block 32 of insulating material which is supported on the adjacent stationary internal part of the base. The contact 30 is connected with the electric feed or supply line 25 and the contact 31 is movable into and out of engagement from the free upper end of an auxiliary contact 33 the lower end of which is mounted on the insulating block 32 and is connected with the electric supply line 26.

On the lower outer part of the liquid container is mounted an insulating block 34 which carries two contacts 35, 36 of a switch plug or jack arranged side by side and projecting downwardly. These plug contacts are connected with opposite ends of the coil of the heating element 9 so as to form the terminals thereof and the upper parts of the same are covered by a hood 37 so as to prevent the hand of the operator during normal use of the apparatus from touching the lower ends of the plug contacts 35, 36 which project below the hood and possibly receiving a shock or being injured.

Upon lowering the liquid container until its underside rests in the seat of the base and passing the lower ends of the plug contacts 35, 36 downwardly through the eye 29 and opening 27, these contacts during the initial part of this movement will engage the main contacts 30, 31 of the supply line and spread them thereby closing the electric circuit of the heating element adjacent to the opening 27 of the base and during the final part of the downward movement of the main contacts the contact 31 is moved laterally into engagement with the auxiliary contact 33, thereby completing closing the circuit of the heating element at a point considerably below the opening 27 in the top of the base and preventing the electric arc which may be formed between the contacts 31 and 33 from injuring the operator. When the plug contacts 35, 36 engage the main line contacts 30, 31 and the main line contact 31 engages the auxiliary contact 33, as shown in Fig. 5, then the electric current is conducted from the main supply lines 25, 26 through the coil of the heating element and heat is produced for heating the liquid container. When the liquid in the container has been heated sufficiently the container is lifted from the base thereby withdrawing the plug contacts 35, 36 from the main line contacts 30, 31 and also disengaging the main line contact 31 from the auxiliary line contact 33, thereby automatically disconnecting the electric current supply from the heating element and arresting the further heating of the contents in the container. When the container is thus removed from the base the main line contact 31 is dead and the circuit cannot be closed by engaging the same with the other main line contact 30 or with the auxiliary line contact 33, thereby avoiding all possibility of shock if any water should enter the base through the opening 27 while cleaning the apparatus.

It is desirable to prevent the containers from being lowered into the socket of the base unless the electric switch plug of the heating element is vertically in line with the coupling opening 27 in the base otherwise the lower ends of the plug contacts might be injured and the container might be tilted objectionably by reason of the plug contacts 35, 36 striking the top of the base. To avoid this possibility guiding means are provided which preferably consist of complementary elements arranged respectively on the base and container and which are adapted to engage slidingly with each other in a direction lengthwise of the axis of the container. These guiding means in the present instance consist of a plurality of vertical guide grooves 38 arranged in spaced relation circumferentially around the inner side of the wall of the socket of the base, and a plurality of vertical guide ribs or keys 39 arranged in correspondingly spaced relation circumferentially around the lower part of the periphery of the container and adapted to engage the guide grooves of the base. When the container is moved downwardly toward the socket in the base while the guide ribs are not in alignment with the guide grooves in the base, said ribs will engage their lower ends with the top of the base around the socket thereof and thereby prevent the contact plug, which at this time is not in register with the guide opening 27 in the base, from striking the top of the base. Upon, however, turning the container so that its guide ribs are in line with the respective guide grooves in the base then the container can be lowered for seating the lower end of the base in the socket of the base during which time the guide ribs 39 slide downwardly in the guide grooves 38 and the heater contacts 35, 36 move downwardly through the guide opening 27 and into engagement with the main line contacts 30, 31, as heretofore described.

The means for agitating or mixing the liquid contents of the container in their preferred form, as shown in the drawings, are constructed as follows:

The numeral 40 represents a vertical mixer shaft arranged eccentrically within the container or on one side of the vertical center or longitudinal axis of the container. This shaft is journaled between its upper and lower ends in a bearing 41 which is mounted on the upper end of a tubular standard 42 which extends from the bottom 24 of the outer body wall of the container through the bottom 23 of the container lining and into the lower part of the space within the container, as shown in Figs. 1 and 6. At its upper end the mixer shaft is provided with a liquid impeller, stirrer or dasher which in its preferred form consists of a sleeve 43 which is detachably secured by friction with the upper end of the mixer shaft within the container and is provided at its upper and lower ends with corrugated disks or blades 44 which impinge on the liquid and cause the same to be agitated and mixed preparatory to being served to a customer.

The power for rotating the mixer shaft and the impeller mounted thereon is preferably derived from an electric motor 45 which is mounted in any suitable manner on the interior of the base and is supplied with current from the main lines 25, 26 by branch lines 46, 47. That part of the electric circuit containing this motor is preferably automatically controlled so that when the container is removed from the socket in the base, then this circuit will be broken and the motor will not operate but when the container is placed in this seat the circuit containing the motor will be closed and the latter will operate. Although various means may be utilized for accomplishing this purpose those shown in the drawings are satisfactory and comprise two switch contacts 48, 49 preferably having the form of resilient strips mounted one above the other by means of an insulated support on the inner side of the base, and a plunger 50 slidable vertically in the bottom of said socket and engaging its lower end with the upper switch contact 48 while its upper end is arranged to be engaged by a push plate 51 forming a part of the bottom of the container. When the container is removed from the socket the free ends of the two contacts 48, 49 are raised and separated so as to open the motor circuit and the upper contact 48 raises the plunger 50 so that its upper end projects above the bottom of the socket. Upon placing the container in the socket the push plate 51 on the underside of its bottom engages the plunger 50 and depresses the same sufficiently to move the upper contact 48 downwardly into engagement with the lower contact 49 and possibly also depress the latter to some extent, thereby closing the electric circuit of the motor and causing the latter to operate.

Means are provided for automatically coupling the agitating means in the container with the motor upon placing the container in the socket and also uncoupling this agitator from the motor upon lifting the container out of the socket. The coupling means for this purpose shown in the drawings are constructed as follows:

The numeral 52 represents the upright driving shaft of the electric motor which projects upwardly through the top of the base and has its axis arranged eccentrically to, or on one side of, the vertical axis or center of the container to the same extent as the axis of the mixer shaft 40. Above the upper end of the driving shaft is arranged a coupling cup 53 which is connected therewith by a universal joint 54 and which is adapted to receive a coupling head 55 on the lower end of the mixer shaft 40. The latter is constantly urged downwardly by a spring 56 surrounding the lower part of the mixer shaft and bearing at its upper and lower ends, respectively, against the lower end of the bearing 41 and the upper side of the coupling head 55. The downward movement of the coupling head into the coupling cup when these parts are engaged is limited by a shoulder 57 on this head engaging with the upper end of the coupling cup, as shown in Fig. 1, but when the container is removed from the socket of the base the downward movement of the mixer shaft and associated parts is limited by the lower end of the sleeve 43 of the dasher engaging with the upper end of the bearing 41 in which the mixer shaft is journaled.

When the parts are in their properly assembled position for use the lower tubular standard 42 of the container fits over or receives the upper end of a tubular retaining or registering post 58 which is mounted on the base and arranged concentrically around the driving shaft of the motor and its coupling cup, as shown in Fig. 1. For the purpose of operatively connecting the coupling cup with the coupling head the opposing surfaces of the same are so constructed that they interlock when assembled, this being preferably accomplished by providing the bore of the coupling cup with a plurality of notches 59 which receive the corners 60 on the side of the coupling head, as shown in Fig. 4.

In the operation of assembling the parts for effecting mixing and heating of the liquid contents of the container the latter is placed over the socket of the base and turned about its axis so as to bring the tubular standard 42 of the container in line with the retaining post 58 of the base and also bring the ribs 39 of the container in register with the respective guide grooves 38 of the base. When the parts are in this position the container can be lowered so that its lower end rests in the socket and the lower end of the tubular standard 42 also slips over the tubular post. When the container is thus seated in the socket the push plate 51 depresses the plunger so as to close the switch contacts 48, 49 and cause the motor to turn the driving shaft 52 and the plug contacts 35, 36 are also pushed downwardly through the opening 27 in the base so as to couple the heating element with the electric circuit and cause the contents of the container to be heated.

Unless the container is turned about its axis so as to bring the axis of the mixer shaft into alinement with the driving shaft the container cannot be lowered inasmuch as the container when in any other position relative to the base would engage its bottom with the upper end of the tubular bearing post 58 and also engage the lower end of its guide ribs 39 with the upper surface of the base and thereby compel proper positioning of the container before the parts can be assembled for liquid mixing and heating purposes.

If the container should be lowered while the coupling head of the mixer shaft and the coupling cup are not in the proper relative position to permit of interlocking the coupling surfaces thereof, then the coupling head 55 will engage the upper end of the coupling cup and hold back the mixer shaft while the container moves downwardly independently of this shaft and cause the spring 56 to be compressed. As soon, however, as the driving shaft has effected the initial part of its turning movement and brought the notches 59 of the coupling cup into register with the corners 60 of the coupling head, the resilience of the spring 56 will move the mixer shaft downwardly and interlock the coupling head and cup and rotate the agitating device.

Owing to the axes of the driving shaft and mixer shaft being arranged eccentrically relative to the vertical axis of the container, the rotary movement of the mechanism which operates the agitator is prevented from turning the container about its axis, thereby avoiding displacement of any parts of the apparatus while the same is in use.

Moreover, the eccentric location of the agitating device within the container causes the liquid under treatment to circulate vertically within the container during the mixing operation instead of being formed into a vortex in the container which would occur if the agitator were rotated about an axis coincident with that of the container.

This effect of preventing rotation of the container by arranging the mixing shaft and the motor shaft eccentrically relative to the axis of the container is obtained independent of the guiding effect of the ribs 39 and grooves 38, these last mentioned elements serving primarily as vertical guides which compel the container to be lowered in a vertical position while assembling the same with the base and coupling the motor with the agitator and connecting the heating element with the electric supply circuit, and thus preventing tilting of the container and possible spilling of its contents during the assembling operation.

In the event that a customer desires a mixed drink which does not require heating, a container may be used which is not equipped with the heating element and means for connecting the same to an electric current supply and if it is desired to serve a heated drink which is not mixed then a container having no agitating means may be employed.

In its complete form this combined liquid mixer and heater is very compact so as to take up comparatively little space on a refreshment counter and the same is also very neat in appearance and capable of being easily handled by an operator.

I claim as my invention:

A liquid mixing device comprising a base provided on its top with a socket and a vertical groove in the side of the socket, a liquid container having its lower end removably seated in said socket and provided on its bottom with a downwardly opening chamber and also provided on its side with vertical ribs engaging with said groove, a mixer shaft journaled in a bearing at the upper end of said chamber and provided at its upper end within the container with an impeller and also provided at its lower end within said chamber with a non-circular coupling head, said shaft being slidable vertically in said bearing, a motor mounted on said base and having a driving shaft which is provided at its upper end with a non-circular coupling socket which receives said coupling head, the axes of said driving shaft and mixer shaft being vertically in line but on one side of the center of said container, and a spring interposed between said coupling head and bearing and operating to hold said head yieldingly in engagement with said coupling socket.

HAROLD HAGEN.